Nov. 23, 1926.

A. DEWANDRE 1,608,203

SERVO BRAKE

Filed July 27, 1925    3 Sheets-Sheet 1

Inventor:
Albert Dewandre
By
Attorney

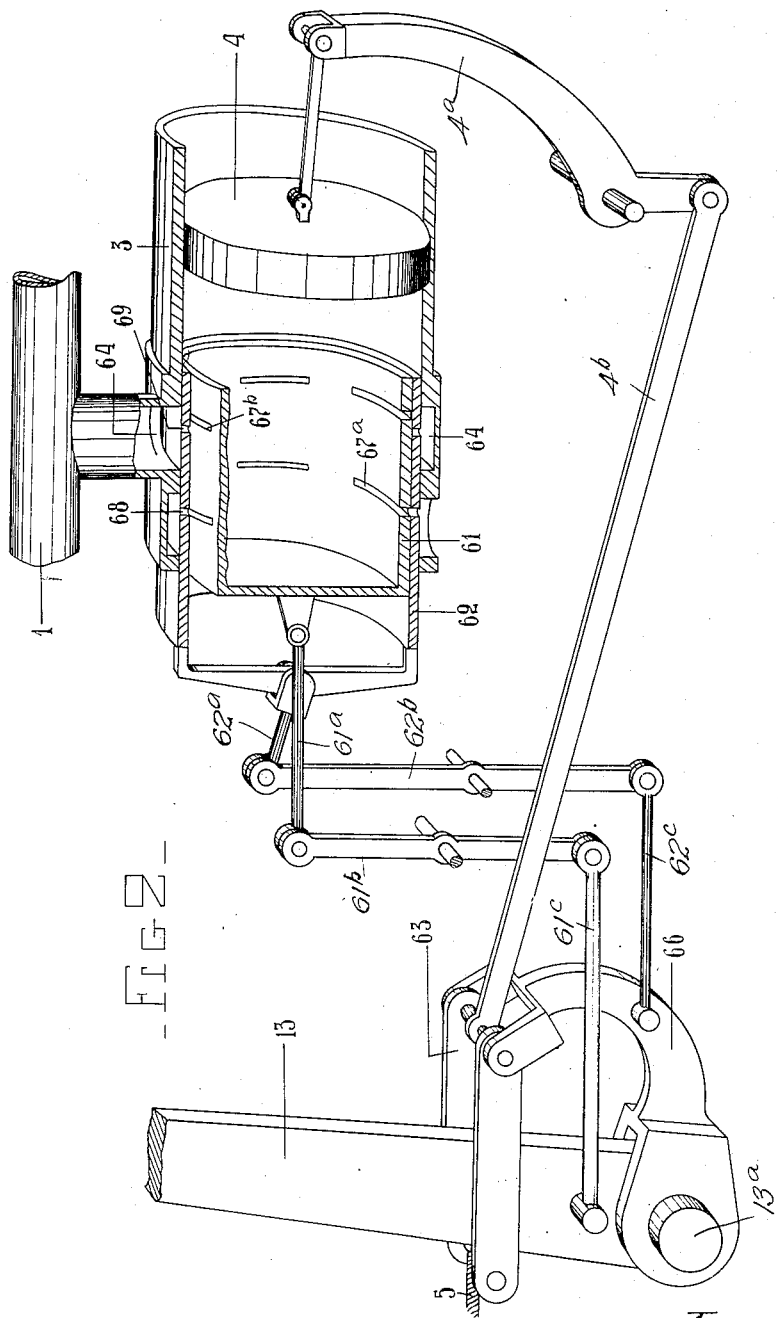

Nov. 23, 1926.  1,608,203
A. DEWANDRE
SERVO BRAKE
Filed July 27, 1925  3 Sheets-Sheet 3
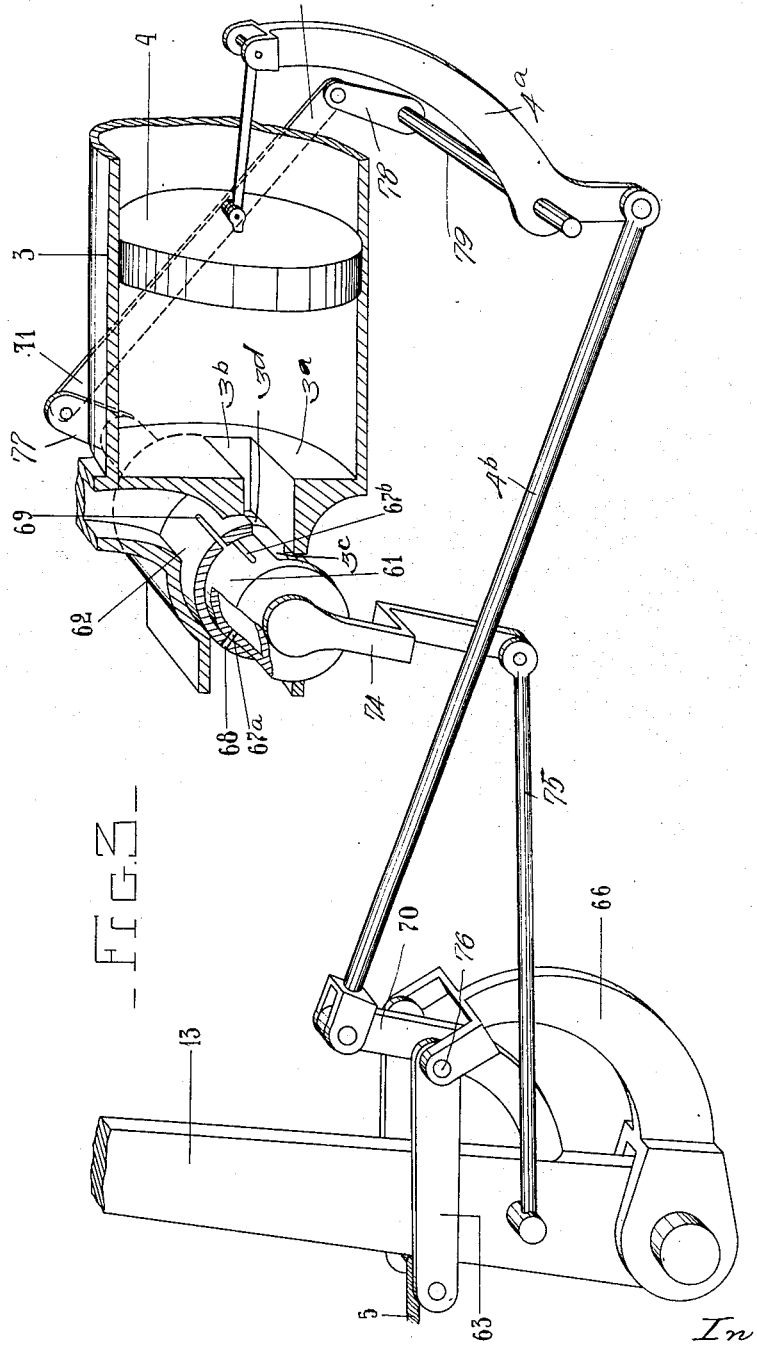
Inventor:
Albert Dewandre
By [signature]
   Attorney.

Patented Nov. 23, 1926.

1,608,203

UNITED STATES PATENT OFFICE.

ALBERT DEWANDRE, OF BRUSSELS, BELGIUM, ASSIGNOR TO SOCIETE ANONYME SERVO FREIN DEWANDRE, OF LIEGE, BELGIUM.

SERVO-BRAKE.

Application filed July 27, 1925, Serial No. 46,402, and in Belgium October 7, 1924.

The present invention relates to that type of servo brake device which is actuated by means of a so-called fixed control so constructed that it has, among others, the following special characteristics:

When the control lever (the pedal) has been displaced for the purpose of applying or releasing the brakes, this operation is accomplished with the intervention of the auxiliary source of energy (for instance, the partial vacuum produced by the suction of the engine) without the said control lever undergoing either a change of position, or a change in the effort to which it is subjected.

The invention relates to a new form of construction of that type of servo brake control device.

In the present arrangement as, in the previous arrangements, the braking effort is produced by the action of a partial vacuum regulated by means of a distributing system influenced by the distance which exists between the two parts of a loose connection, which allows a certain amount of play, provided between the control lever and the mechanism.

According to the invention, the distributing system comprises two slide valves connected to each of the said parts of the loose connection respectively.

These slide valves may consist of cylindrical sleeves with a relative axial movement or a relative rotary movement, and they are provided with ports distributed in three groups:

One group is in communication with the brake cylinder, a second with the source of partial vacuum and the third with the atmosphere.

According to the relative position of the said parts of the loose connection, the first group is cut off from the other two or is put into communication with one or the other of them.

The invention relates also to an arrangement generally applicable to suction actuated brakes and according to which the control lever or pedal exerts at every moment a reaction opposite to the action exerted by the operator in the direction corresponding to an increasing of the braking intensity; this reaction being a function of the braking intensity.

In the present construction, the reaction is produced by subjecting to the vacuum which acts on the piston connected to the brake rodding, a second piston connected to the control lever.

By combining this arrangement with the slide valves above specified, the slide valve connected to the control lever may consist of a member subjected to the action of the partial vacuum which exists in the brake cylinder.

The invention also provides for special forms of construction of the loose connection interposed between the control lever and the brake mechanism, and for the actuation of the distributor by means of the parts of this connection.

The accompanying drawings illustrate, by way of example, three forms of construction.

In these drawings:—

Figure 2 is a perspective view, with parts in section, showing the means for obtaining the reaction by causing the partial vacuum to act upon one of the slide valves. The position illustrated is that which the parts occupy during the release movement.

Figure 3 is a part-sectional perspective view of a modified construction comprising slide valves consisting of concentric sleeves having a rotary movement. The position is the same as in Figure 2.

Figure 1:
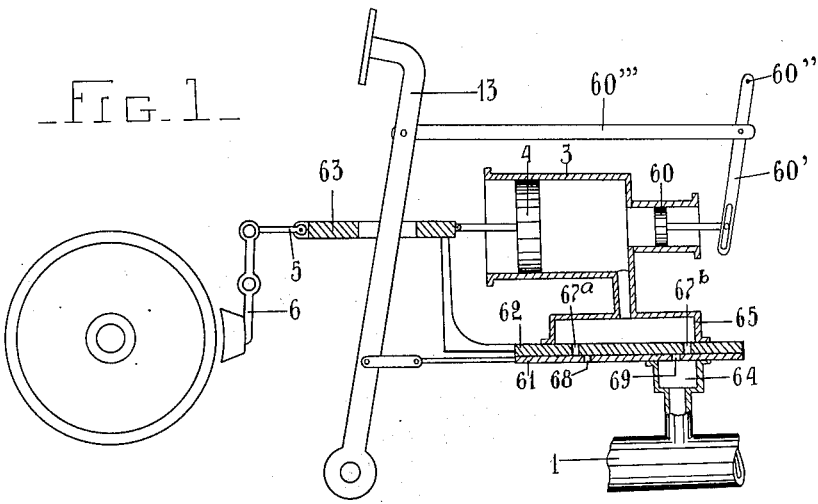
Figure 1 is a diagrammatic view in side elevation, with parts in section, which brings out the principle of the invention.

In Figure 1, the brake mechanism is indicated by a shoe carried by a lever 6 situated at the side of a wheel.

The brakes are applied by transmitting to the cylinder 3 the partial vacuum which exists in the suction pipe 1 of the engine of the vehicle. The brakes are released by re-establishing atmospheric pressure in the cylinder 3. This operation is controlled by a distributing system comprising two slide valves 61 and 62 provided with ports such as 67$^a$, 67$^b$, 68 and 69. The ports 67$^a$ and 67$^b$ are in permanent communication with the cylinder 3, by way of chamber 65, the port 68 with the atmosphere and the port 69 with the suction pipe 1 by way of chamber 64.

The slide valve 61 is connected to the pedal 13, while the slide valve 62 is connected to a member 63 which is connected by the link 5 to the lever 6 so as to enable it to take part in the transmission of the braking force to the brake mechanism, in which transmission the pedal 13 may also take part. This member 63 forms therefore part of a loose connection, that is, a connection allowing a certain amount of play, provided between the pedal 13 and the mechanism 6.

The positions occupied by the members shown in Figure 1 correspond to the neutral position. If the pedal is moved in a clockwise direction, the port 69 comes into line with the port 67$^b$ and the partial vacuum is transmitted in the cylinder 3, which corresponds to an application of the brakes. When this application of the brakes takes place, the slide valve 62 moves towards the right which cuts off the communication between the ports 67$^b$ and 69. The slide valves have returned into the neutral position. A fresh movement of the pedal 13 in the same direction produces a new braking effort. A movement of the pedal in the opposite direction is obtained by releasing the foot pressure thereon, whereupon the pedal is returned, in the manner subsequently explained by the reaction means hereafter described and comprising the piston 60, lever 60' and rod 60'''. The return movement of the pedal causes release of the brakes due to the fact that the ports 67$^a$ and 68 are placed in communication with each other and permit air to enter into the brake cylinder 3. The piston 4 and the slide valve 62 will move towards the left, which will bring the relative positions of the slide valves back to the neutral position until a fresh movement is made by the pedal 13. It will thus be seen that a braking effort can be obtained the intensity of which is greater than that which can be obtained by the partial vacuum alone, by moving the member 63 directly by the pedal 13, it being understood that the arrangement of the parts is such that the pedal and other movable elements do not occupy their extreme forward positions when the action transmitted to the brakes by the partial vacuum is at its maximum.

A reaction proportional to the braking intensity is obtained on the pedal by means of the above-mentioned auxiliary piston 60 which is subjected to the vacuum acting on the main piston 4 and is connected to the said pedal so as to transmit to the said pedal the effort to which it is subjected in a direction opposite to the direction corresponding to an increasing of the braking intensity.

In Fig. 1, the stem of the auxiliary or reaction piston 60 is loosely connected to the lower portion of the lever or arm 60' which is pivoted at its upper end on a pin 60'' and is joined to the pedal 13 by the rod or link 60''' as stated above.

Referring now to Fig. 2, the numerals therein indicate parts similar to those in Fig. 1, the chief difference being that instead of the valves being shown as flat slides arranged face to face, in Fig. 2 they are of cylindrical form and are mounted to have a longitudinal sliding movement within the vacuum cylinder 3. The valve 61, which is formed as a trunk piston and is opposed to the vacuum piston 4, is connected by link 61$^a$ to one end of a two-armed lever 61$^b$, the other end of which is linked by the part 61$^c$ to the lower end of the usual brake-operating lever or pedal 13. The second slide valve 62 is formed as an open-ended sleeve which is interposed between the slide valve 61 and the wall of the cylinder 3 and which has one end connected by link 62$^a$ to one arm of a two-armed lever 62$^b$, the other end of which, by means of a link 62$^c$, is operatively connected to a curved lever 66 loosely fulcrumed on the shaft 13$^a$ that forms the fulcrum for the operating pedal 13. The vacuum piston 4 is linked to one end of a two-armed lever 4$^a$, the other end of which is attached by means of a rod 4$^b$ to a slotted or open link 63 which is adapted to transmit its movement to the brake mechanism (not shown) through the intermediary of the connection 5. The parts of the lost-motion device in this instance are constituted by the operating pedal 13 and the slotted link 63, and it is to be noted that for the purpose of supporting the free end of the link 63 and the member 4$^b$ the lever 66 is forked so that it can connect these parts together.

The operation is as follows: The illustrated position of the parts shows the slide valves in the position wherein the atmosphere has access to the space between the brake piston 4 and the trunk or auxiliary piston which constitutes the slide valve 61. The induction pipe 1 is in communication with a surrounding chamber 64, so that when the ports 67$^b$ and 69 therein are in register, the negative pressure or suction prevailing in pipe 1 will be transmitted to the space between the pistons.

When a braking action is to be initiated, a movement of the brake pedal in a clockwise direction will, by means of link 61$^c$, two-armed lever 61$^b$ and link 61$^a$, cause the trunk piston 61 to move to the left. This will have the effect of first closing the ports 67$^a$ and 68, so that the interior of the vacuum cylinder will be cut off from atmosphere. The continued movement of the trunk piston will then bring into register the suction ports 67$^b$ and 69, whereby a suction action is exerted in the space between the two pistons which tends to draw them toward each other. The resulting movement upon the piston 4, by means of the members 4$^a$, 4$^b$, link 63 and the connection 5, will cause the brakes to be applied; and the movement of the trunk piston 61 in the opposite direction, by means of link 61ᵃ, lever 61ᵇ and link 61ᶜ, will exert a reactionary force against the movement of the operating pedal 13, so that the operator receives an indication of the strength of the braking action which is being applied. This action of applying the brake, should there be no further movement of the brake-operating pedal, will cause the suction effort from the induction pipe 1 to be cut off, but will not be such as to open the atmospheric pressure ports, which latter action is effected by the movement of the curved lever 66 through link 62ᶜ, double-armed lever 62ᵇ and link 62ᵃ to act upon the sleeve 62 which thereupon moves relatively to the trunk piston 61 to interrupt communication between the suction ports 67ᵇ and 69, leaving the parts in a neutral position with all ports closed. Another braking action may then be initiated to apply the brakes and again cut off the suction effort. When the suction power of the induction pipe is exhausted, the brakes may be mechanically applied by being moved into contact with one end of the open link 63.

For release, the foot may be removed altogether from the pedal 13, whereby the parts will return into the positions illustrated; atmospheric pressure being then allowed to pass into the interior of the vacuum cylinder to release the brakes.

Referring now to Fig. 3: The parts in this modification are generally similar to those shown in Fig. 2; but instead of the slide valves being arranged as longitudinally-sliding cylindrical members, they are in the form of concentric sleeves rotatable about their own axes after the manner of a plug valve, and are arranged transversely at one end of the vacuum cylinder 3.

For this purpose, the valve 61 has the form of a hollow plug, and the valve 62 consists of a sleeve concentrically mounted thereon. Longitudinal ports 67ᵇ and 69 in the plug 61 and sleeve 62, respectively, are in communication with a duct which leads to the induction pipe (not shown), while ports 67ᵃ and 68 allow atmospheric pressure to be admitted to the interior of the plug 61. One end of the cylinder 3 is closed off by a partition 3ᵃ in which are formed suitable bearings to support the plug 61 and sleeve 62, and a port 3ᵇ is also formed in such partition for coaction with ports 3ᶜ and 3ᵈ in said plug and sleeve, respectively, to enable either suction or atmospheric pressure to act within said cylinder, the ports 3ᶜ and 3ᵈ being of sufficient width to remain constantly in registering relation with each other and with port 3ᵇ.

For effecting the operation of the plug valve 61, one end thereof is fitted with a lever 74 connected by a link 75 to the lower end of the operating pedal or lever 13. The vacuum piston 4 is linked to one end of a lever 4ᵃ which, through the medium of a connecting member 4ᵇ, is joined to one end of a two-armed lever 70 fulcrumed at 76 upon the open link 63, the other end of the double-armed lever 70 being in contact with the lower end of the operating pedal 13. The parts 63 and 70 are supported in the forked extremity of the curved lever 66 similarly to the arrangement shown in Fig. 2.

In order that the sleeve 62 may be operated, its end remote from the lever 74 is fitted with an operating lever 77 which is connected through rod 71 to a crank 78 attached to the shaft 79 which forms the fulcrum of the lever 4ᵃ.

The operation is as follows: With the parts in the position shown—that is to say, with the atmospheric ports 67ᵃ and 68 in communication with each other—atmospheric pressure is acting within the cylinder 3, so that upon an initiation of a braking action by pressing the pedal 13 in a clockwise direction, such movement first acts through link 75 and lever 74 to shut off communication between the atmospheric ports 67ᵃ and 68 and subsequently brings the suction ports 67ᵇ and 69 into register, whereby the suction of the motor through these ports will be put into communication with the interior of the vacuum cylinder through the port 3ᵇ. The suction acting upon piston 4 will thereupon swing lever 4ᵃ about its fulcrum 79, and by means of connecting member 4ᵇ such movement will be transmitted to act not only upon the brake-applying connection 5 but also to swing or press the lever 7 against the brake-operating pedal 13 in order to produce the reactionary effort desired.

The resulting movement of applying the brakes will then act by means of the rotary or turning movement imparted to shaft 79 through crank 78, rod 71 and lever 77 to cut off communication between the two suction ports, so that the brakes are held on, ready for another braking action by means of the pedal 13. The final releasing action will eventually cause communication to be set up between the atmospheric ports 68 and 67ᵃ, whereby the parts will be restored to their normal position.

Figure 4:
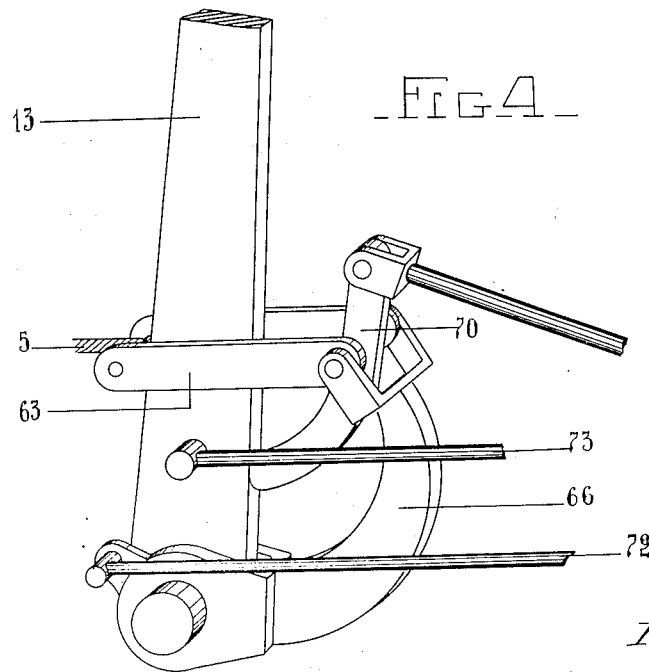
Figure 4 is a perspective view showing a modification of the means for the actuation of the slide valves.

Fig. 4 shows that it is also possible to connect a valve such as 62 to the curved arm 66. In such an arrangement, the valve 62, which is not illustrated, is adapted to be operated by the rod 72, while rod 73 connected to the pedal 13 will operate the other valve (likewise unillustrated).

What I claim is:—

1. In a servo-brake of the type in which the braking force is produced by the action of a partial vacuum on a piston disposed in the brake cylinder and connected to the brake-rodding, the combination, with a control lever, of a distributing system for regulating the vacuum action comprising two slide valves, one connected to said lever and the other connected to the rodding to cut off the action produced by the movement of the first one; said valves being provided with ports arranged in three groups, one communicating with the brake cylinder, a second with the source of suction, and the third with atmosphere; and a lost-motion connection between the rodding and the control lever and to the opposed parts of which the valves are connected for bringing the first group of ports into registration alternatively with the second or third groups or out of registration with both groups according to the distance between the said parts of the lost-motion connection.

2. A servo-brake, according to claim 1, in which one of the valves forms a second piston located in the brake cylinder to be subjected to the partial vacuum therein, and has a positive connection with the control lever.

3. In a servo-brake of the type in which the braking force is produced by the action of a partial vacuum on a piston disposed in the brake cylinder and connected to the brake-rodding, the combination, with a control lever, of a distributing system for regulating the vacuum action, and a lost-motion connection between the rodding and the control lever and with which the distributing system is associated for influencing said system in accordance with the relative play of the parts of such connection; said distributing system including a second piston located in the brake cylinder to be subjected to the vacuum therein and having a positive connection with the control lever.

4. In a servo-brake of the type in which the braking force is produced by the action of a partial vacuum on a piston disposed in the brake cylinder and connected to the brake-rodding, the combination, with a control lever, of a distributing system for regulating the vacuum action, and a lost-motion connection between the rodding and the control lever and with which the distributing system is associated for influencing said system in accordance with the relative play of the parts of such connection; said distributing system comprising a slide valve subjected to the partial vacuum, and a member connected to said valve for transmitting the action exerted thereon by the vacuum to the control lever in a direction opposite that required for applying the brakes.

5. In a servo-brake of the type in which the braking force is produced by the action of a partial vacuum on a piston disposed in the brake cylinder and connected with the brake-rodding, the combination, with a control lever, of a distributing system for regulating the vacuum action, a lost-motion connection between the rodding and the control lever and with which the distributing system is associated for influencing said system in accordance with the relative play of the parts of such connection; said connection including an arm mounted co-pivotally with the control lever; and a member forming part of the rodding and supported by said arm.

6. In a servo-brake of the type in which the braking force is produced by the action of a partial vacuum on a piston disposed in the brake cylinder and connected with the brake-rodding, the combination, with a control lever, of a distributing system for regulating the vacuum action comprising a pair of slide valves, one of which is connected with said lever, a lost-motion connection between the rodding and the control lever and with which the distributing system is associated for influencing said system in accordance with the relative play of the parts of such connection; said connection including an arm mounted co-pivotally with the control lever and movable relatively to the same; and a connection between said arm and the other valve.

In testimony whereof I affix my signature.

ALBERT DEWANDRE.